United States Patent [19]

Nishikawa et al.

[11] Patent Number: 4,746,559

[45] Date of Patent: May 24, 1988

[54] MAGNETIC RECORDING MEDIUM

[75] Inventors: Yasuo Nishikawa; Tadashi Ishikuro, both of Kanagawa, Japan

[73] Assignee: Fuji Photo Film Co., Ltd., Kanagawa, Japan

[21] Appl. No.: 931,828

[22] Filed: Nov. 18, 1986

[30] Foreign Application Priority Data

Nov. 18, 1985 [JP] Japan ................................ 60-257988

[51] Int. Cl.$^4$ .............................................. G11B 5/72
[52] U.S. Cl. ..................................... 428/142; 427/128; 427/131; 427/132; 428/216; 428/335; 428/336; 428/457; 428/694; 428/695; 428/900; 428/148
[58] Field of Search ............... 428/694, 695, 457, 216, 428/142, 336, 335, 148, 900; 427/131, 132, 128; 360/134–136

[56] References Cited

U.S. PATENT DOCUMENTS

| | | | |
|---|---|---|---|
| 4,599,266 | 7/1986 | Nakayama | 427/41 |
| 4,615,930 | 10/1986 | Matsumoto | 428/900 |
| 4,647,507 | 3/1987 | Suzuki | 428/422 |

FOREIGN PATENT DOCUMENTS 0196954 5/1985 Japan .
96519/86 5/1986 Japan .

Primary Examiner—Ellis P. Robinson
Attorney, Agent, or Firm—Sughrue, Mion, Zion, Macpeak & Seas

[57] ABSTRACT

Disclosed is a magnetic recording medium comprising a non-magnetic support having provided thereon a ferromagnetic metal thin film provided with a layer containing a compound having a mercapto group. This layer may also contain an ester bond. The magnetic recording medium shows improved running properties and wear resistance over wide ranges of temperature and humidity.

15 Claims, No Drawings

MAGNETIC RECORDING MEDIUM

FIELD OF THE INVENTION

The present invention relates to a magnetic recording medium comprising a ferromagnetic metal thin film as a magnetic recording layer, and more particularly it relates to a thin metal film type magnetic recording medium having excellent running properties and wear resistance over wide ranges of temperature and humidity.

BACKGROUND OF THE INVENTION

A coated type magnetic recording medium which is prepared by dispersing magnetic particles or ferromagnetic metal particles such as $\gamma$-$Fe_2O_3$, Co-doped $\gamma$-$Fe_2O_3$, $Fe_3O_4$, Co-doped $Fe_3O_4$, Bertholide compound of $\gamma$-$Fe_3O_4$, and $C_rO_2$ in an organic binder such as a vinyl chloride-vinyl acetate copolymer, a styrene-butadiene copolymer, an epoxy resin or a polyurethane resin, coating the magnetic coating composition on a non-magnetic support and drying it has been widely used. With the recent demand for high density recording, various research and studies have been developed to manufacture a thin metal film type magnetic recording medium comprising as a magnetic recording layer a ferromagnetic thin metal film which is prepared by a vapor deposition method such as vacuum evaporation, sputtering, ion plating or plating such as electroplating or electroless plating without using a binder.

To realize high density recording of a magnetic recording medium, it has been theoretically and experimentally proposed to have a higher coercive force and to make the medium thinner. Therefore, a thin metal film type magnetic recording medium which can be made thinner by 1/10 time and can have a higher saturated magnetic flux density than a coated type magnetic recording medium has been greatly desired.

Particularly a vapor deposition method is very effective, because treatment of waste solution as is required for a plating method is unnecessary, the manufacturing process is simple and the rate for precipitating a film can be made higher. It is known that a magnetic film having a desirable coercive force and a squareness ratio in a magnetic recording medium can be prepared by an oblique vapor deposition method as one of the vacuum evaporation methods, as disclosed in U.S. Pat. Nos. 3,342,632 and 3,342,633. Further, a magnetic recording medium comprising a ferromagnetic metal thin film has problems such as weather resistance, running properties and wear resistance. Upon recording, reproducing and erasing magnetic signals, a magnetic recording medium is put in a high speed motion relative to the magnetic head. In this case, a magnetic recording medium should run smoothly and stably without making contact with the head causing wear and damage. In view of the above-described background, studies have been made to provide a lubricating layer and a protective layer in order to improve running properties and durability.

A protective layer used for a thin metal film type magnetic recording medium can be prepared by dissolving in organic solvents a thermoplastic resin, a thermosetting resin, a fatty acid, metal salts of a fatty acid, fatty acid ester or alkyl phosphate and the like and coating it, as disclosed, for example, in Japanese Patent Application (OPI) Nos. 69824/1985 and 85427/1985 (the term "OPI" as used herein means an "unexamined published application".)

However, there are still problems such as running properties and wear resistance of the resulting thin metal film type magnetic recording medium are not satisfactory and spacing loss between the head and the tape due to the thickness of the protective layer or the lubricating layer deteriorates electromagnetic properties. Therefore, improvements are still required for realizing a thin metal film type magnetic recording medium.

SUMMARY OF THE INVENTION

After thorough research directed to a thin metal film type magnetic recording medium, the present inventors found that wear resistance against parts such as the magnetic head, guide poles and the like is greatly improved and that the frictional coefficient against parts of running systems is largely reduced when a layer containing a compound having a mercapto group, preferably a compound having a mercapto group and an ester bond in the molecule is provided on the surface of a ferromagnetic thin metal film as a magnetic layer provided on a non-magnetic support of the magnetic recording medium and have attained the present invention. That is, the object of the present invention can be attained by a magnetic recording medium wherein a layer containing a compound having a mercapto group, preferably a mercapto group and an ester bond in a molecule is provided on a surface of a ferromagnetic thin metal film which is formed by an electroplating method, an electroless plating method, a gas phase plating method, a sputtering method, an evaporation method or an ion plating method on a non-magnetic support.

DETAILED DESCRIPTION OF THE INVENTION

The compounds which can be used in the present invention are those having a mercapto group in the molecule, of which those having a relatively large molecular weight (about 78 to about 10,000, preferably 100 to 5,000), less volatility and containing a mercapto group and an ester bond in the molecule are preferred. The compounds having a mercapto group are generally saturated or unsaturated aliphatic mercaptan having 1 to 24 carbon atoms which may have a ring structure the compounds may have 1 to 6 mercapto groups.

The compounds having a mercapto group and an ester bond are generally represented by the general formula A—COO—B wherein at least one of A or B is a hydrocarbon group having 1 to 24, preferably 3 to 20, carbon atoms substituted with one or more 1 to 8, preferably 1 to 6, mercapto groups. In this case, it is preferable that at least one of A and B is a group having 3 or more carbon atoms.

The compounds having a mercapto group and an ester bond in the molecule which are synthesized by using a polyfunctional acid, a polyfunctional alcohol, an acid having a hydroxy group and a self condensation product of an acid having a hydroxy group cannot be represented by the above-described general formula A—COO—B, but can be used as effective compounds in the present invention. Among these, are compounds which can be represented by the following general formula HS—R—COO—R' or R'—COO—R—SH where R represents a divalent hydrocarbon group having 1 to 20 carbon atoms and R' represents a monovalent hydrocarbon group having 1 to 20 carbon atoms.

A method generally employed for synthesizing a compound having a mercapto group and an ester bond in the molecule is a condensation reaction of an acid having —COOH (I) and an alcohol having —OH (II). In this case, it is necessary that at least one of (I) or (II) should have a mercapto group. When the molecule has functions of both of (I) and (II), it can form a condensation product alone. (In this case, the condensation product can be a self condensation product having a ring, chain-like oligomer or a polymer.)

Among the thus-condensation products (i.e., compounds having a mercapto group and an ester bond in a molecule), those having one or two ester bonds in the molecule and thus having relatively low molecular weight (e.g., about 100 to about 10,000, preferably 100 to 5,000) are easily employed. Chain-like condensed oligomers and polymers can be also used.

When the above acid (I) is substituted with a mercapto group, specific examples thereof are α-mercapto propionic acid, thioglycol acid (mercapto acetic acid), thiosalicylic acid (o-mercaptobenzoic acid), thiolactic acid and mecaptosuccinic acid (in this case, this acid is a dibasic acid, and a monoester or diester can be formed by esterification, and an oligomer or a polymer can be formed when the substance to be reacted with it is a molecule having plural —OH groups).

When the above-described alcohol (II) is substituted with a mercapto group, specific examples thereof are 2-mercapto ethanol, α-thioglycerol and the like.

When the above described acid (I) has no mercapto group, the structure thereof is not limited. However preferred acids are fatty acids (e.g., acetic acid, propionic acid, lauric acid, myristic acid, palmitic acid, stearic acid, oleic acid, behenic acid and the like), aliphatic dicarboxylic acids (e.g., adipic acid, 2-eicosanic acid, maleic acid and the like), dicarboxylic acids such as 2,2'-thiodiglycolic acid or β,β'-thiodipropionic acid, and various organic acids also having —OH such as dimethylol propionic acid, lactic acid, citric acid, maleic acid or tartaric acid.

When the above described alcohol (II) has no mercapto group, the structure thereof is not limited. However, preferred alcohols are aliphatic alcohols (e.g., methanol, ethanol, myristyl alcohol, stearyl alcohol, behenyl alcohol, oleyl alcohol and the like), various diols or triols (e.g., ethylene glycol, glycerol, hexamethylene diol, 2,2'-thiodiethanol and the like), and various organic alcohols also having a —COOH group such as dimethylol propionic acid, lactic acid, citric acid, maleic acid or tartaric acid.

The compounds having a mercapto group and an ester bond in a molecule, which are prepared in accordance with the above-described method are monoester or diester compounds such as behenyl β-mercaptopropionate, octadecyl β-mercaptopropionate, dodecyl β-mercaptopropionate, octyl β-mercaptopropionate, methyl β-mercaptopropionate, oleyl β-mercaptopropionate, behenyl thioglycolate, octadecyl thioglycolate, dodecyl thioglycolate, octyl thioglycolate, methyl thioglycolate, oleyl thioglycolate, behenyl thiosalycilate, octadecyl thiosalicylate, dodecyl thiosalicylate, octyl thiosalicylate, methyl thiosalicylate, oleyl thiosalicylate, 2-mercaptoethyl stearate, 2-mercaptoethyl oleate, 2-mercaptoethyl myristate, 2-mercaptoethyl laurate, di-2-mercaptoethyl maleate, or 2-mercaptoethyl propionate, and oligoester or polyester compounds having a mercapto group.

Among those compounds, preferred compounds are behenyl β-mercaptopropionate, octadecyl β-mercaptopropionate, dodecyl β-mercaptopropionate, octyl β-mercaptopropionate, oleyl β-mercaptopropionate, behenyl thioglycolate, octadecyl thioglycolate, dodecyl thioglycolate, octyl thioglycolate, oleyl thioglycolate, behenyl thiosalycilate, octadecyl thiosalycilate, dodecyl thiosalycilate, octyl thiosalycilate, methyl thiosalycilate, oleyl thiosalycilate, 2-mercaptoethyl stearate, 2-mercaptoethyl oleate, 2-mercaptoethyl myristate, 2-mercaptoethyl laurate and the more preferred compounds are behenyl β-mercaptopropionate, octadecyl β-mercaptopropionate, dodecyl β-mercaptopropionate, oleyl β-mercaptopropionate, behenyl thioglycolate, octadecyl thioglycolate, dodecyl thioglycolate, oleyl thioglycolate, 2-mercaptoethyl stearate, 2-mercaptoethyl oleate and 2-mercaptoethyl myristate.

Most preferred examples of the mercapto group-containing compound which can be used in the present invention include octadecyl thioglycolate, behenyl thioglycolate, oleyl thioglycolate, cetyl mercaptan, 2-mercaptoethyl stearate and dodecyl thioglycolate.

Commonly used lubricating agents can be added to the protective layer or the lubricating layer containing one or more compounds having a mercapto group as described above which is provided on the surface of a magnetic metal thin film of the present invention in an proportion of about 90:10 to 10:90 by weight based on the mercapto group-containing compound.

The above-described commonly used lubricating agents which can be added to the protective layer or the lubricating layer together with compounds having a mercapto group are a fatty acid, metal soap, fatty acid amide, fatty acid ester, higher aliphatic alcohol, monoalkyl phosphate, dialkyl phosphate, trialkyl phosphate, paraffins, silicone oil, animal and vegetable oil, mineral oil, higher aliphatic amine; inorganic fine particles such as graphite, silica, molybdenum disulfide or tungsten disulfide; fine powders of resins such as polyethylene, polypropylene, polyvinyl chloride, copolymers of ethylene and vinyl chloride or polytetrafluoroethylene; α-olefin polymers; unsaturated aliphatic hydrocarbons which are liquid at a normal temperature and fluorocarbons.

As a method for forming a surface protective layer or a lubricating layer in the present invention, there is a method which comprises dissolving a coating composition into an organic solvent and coating or spraying the resulting coating composition on a support and drying it; a method which comprises melting a coating composition and coating it on a support; a method which comprises dipping a support in a solution where a coating composition is dissolved in an organic solvent to absorb the coating composition on the surface of the support and a method which comprises forming a single molecular film of a coating composition on a surface of a support by the Langmuir Brodgett method, and the like.

The thickness ("thickness" referred to herein means amounts to be used) of a protective layer or a lubricating layer in the present invention is preferably 0.5 mg/m$^2$ to 100 mg/m$^2$, more preferably 2 mg/m$^2$ to 20 mg/m$^2$. When the thickness is less than 0.5 mg/m$^2$, it is difficult to form a uniform film, thereby leading to insufficient running properties and durability. On the other hand, when the thickness is more than 100 mg/m$^2$, electromagnetic properties are degraded because of a spacing loss between a head and a tape.

In order to improve adhesion between a protective layer or a lubricating layer and a metal thin film, a surface of the metal thin film can be treated with a surface active agent such as a fatty acid or various coupling agents before the protective layer or lubricating layer is provided.

The protective or lubricating layer can be a single layer or multiple layers.

Ferromagnetic metal thin films can be formed by electroplating, electroless plating, gas phase plating, sputtering, vapor depositing or ion plating as described, e.g., in U.S. Pat. Nos. 4,395,439, 4,108,739, 3,282,815 and 4,501,225 ferromagnetic metals such as iron, cobalt, nickel and the like or ferromagnetic alloys such as Fe-Co, Fe-Ni, Co-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni-B, Co-Ni-Ag, Co-Ni-Ni, Co-Ni-Ce, Co-Ni-Zn, Co-Ni-Cu, Co-Ni-W or Co-Ni-Re. The film thickness is 0.02 to 2 μm, particularly 0.05 to 0.4 μm when the film is used as a magnetic recording medium.

The above-described ferromagnetic metal thin film can further contain O, N, Cr, Ga, As, Sr, Zr, Nb, Mo, Rh, Pd, Sn, Sb, Te, Pm, Re, Os, Ir, Au, Hg, Pb and Bi.

The surface smoothness of the above-described layer is not particularly defined, but when the surface has unevenness (bumps) of 10 to 1000 Å, running properties and durability are excellent.

The thickness of a support is preferably 4 to 50 μm. An under layer as described, e.g., in U.S. Pat. No. 4,079,169 can be provided on a support to improve adhesion of the ferromagnetic thin film and to improve magnetic properties thereof.

The supports used in the present invention are plastics such as polyethylene terephthalate, polyimide, polyamide, polyvinyl chloride, cellulose triacetate, polycarbonate, polyethylene naphthalate or polyphenylene sulfide or Al, Ti and stainless steel.

The shape of a magnetic recording medium can be a tape, a sheet, a card, and a disk and preferred shapes are a tape and a disk.

The present invention will be illustrated in more detail by the following Example, but the present invention should not be construed as being limited thereto.

EXAMPLE

On a polyethylene terephthalate film having a thickness of 13 μm was provided a cobalt-nickel magnetic film (film thickness: 150 nm) by an oblique vapor deposition while introducing $O_2$ gas to prepare the bulk of a magnetic recording medium. The oblique vapor deposition was conducted by using an electron beam vapor source, charging cobalt-nickel alloy (Co: 80 wt%, Ni: 20%) in a vacuum degree of $5 \times 10^{-5}$ Torr with an angle of incidence of 50°. Various materials for a coating composition were dissolved in methyl ethyl ketone, coated on a thin magnetic metal film of the thus obtained magnetic recording medium, which was then dried to prepare sample Nos. 1 to 9 as shown in Table 1. The frictional coefficient (μ value) against a stainless pole of the resulting tapes at 25° C., 70% RH (A) and at 25° C., 15% RH (B), and running durability after repeated use and still durability were measured using an 8 mm type VTR and the results thereof are shown in Table 2.

The running durability is shown in terms of passes of tapes of 50 m length for replaying using 8 mm type VTR ("FUJIX-8 m6 Type", a trade name, manufactured by Fuji Photo Film Co., Ltd.) until images are disturbed due to unstable running after repeated replaying or until tapes stop running because of an increase in the frictional coefficient. The still durability is shown in terms of the time for images not to turn out when images are replayed, setting the "pause" button, using the above described VTR (where the device for limiting the time of still replaying was removed).

It is apparent from the above that a metal thin film type magnetic recording medium on the surface of which is provided with a layer containing a compound having a mercapto group in the molecule, particularly a compound having a mercapto group and an ester bond in the molecule exhibits excellent results in value and running properties after repeated use over wide ranges of temperature and humidity.

TABLE 1

| No. | Materials | | Amounts to be coated |
|---|---|---|---|
| 1 | Example 1 | Octadecyl thioglycolate | 15 mg/m² |
| 2 | Example 2 | Behenyl thioglycolate | 8 mg/m² |
| 3 | Example 3 | Oleyl thioglycolate | 15 mg/m² |
| 4 | Example 4 | Cetyl mercaptan | 10 mg/m² |
| 5 | Example 5 | 2-Mercaptoethyl stearate | 17 mg/m² |
| 6 | Example 6 | Dodecyl thioglycolate | 15 mg/m² |
| 7 | Comparative Example 1 | $(C_{16}H_{33}O)_3P=O$ | 15 mg/m² |
| 8 | Comparative Example 2 | $C_{16}H_{33}OCOC_2H_5$ | 15 mg/m² |
| 9 | Comparative Example 3 | $C_{17}H_{35}COOH$ | 15 mg/m² |

TABLE 2

| | Friction Coefficient | | Running durability number of passes | | Still durability/min. | |
|---|---|---|---|---|---|---|
| No. | (A) | (B) | (A) | (B) | (A) | (B) |
| 1 | 0.16 | 0.15 | 300 | 300 | 60 | 60 |
| 2 | 0.18 | 0.16 | 300 | 300 | 60 | 60 |
| 3 | 0.19 | 0.20 | 300 | 300 | 60 | 60 |
| 4 | 0.18 | 0.22 | 300 | 300 | 60 | 60 |
| 5 | 0.20 | 0.20 | 300 | 300 | 60 | 60 |
| 6 | 0.20 | 0.20 | 300 | 300 | 60 | 60 |
| 7 | 0.25 | 0.30 | 200 | 70 | 22 | 8 |
| 8 | 0.27 | 0.40 | 120 | 80 | 20 | 6 |
| 9 | 0.23 | 0.37 | 110 | 80 | 20 | 9 |

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a ferromagnetic metal thin film provided with a layer containing a compound having a mercapto group which has a molecular weight of from about 78 to about 10,000, wherein: said compound having a mercapto group also has an ester bond; the layer containing the compound having a mercapto group has a thickness of 0.5 mg/m² to 100 mg/m² and wherein said compound having a mercapto group and an ester bond is represented by general formula

A—COO—B wherein one of A and B represents a hydrocarbon group substituted with one or more mercapto groups, and the other represents a hydrocarbon group, or both of A and B independently represent a hydrocarbon group substituted with one or more mercapto group.

2. A magnetic recording medium as claimed in claim 1, wherein said support has provided thereon an under layer.

3. A magnetic recording medium as claimed in claim 1, wherein said support has provided thereon an under layer.

4. A magnetic recording medium as claimed in claim 1, wherein said metal thin film is one treated with a surface active agent or a coupling agent.

5. A magnetic recording medium as claimed in claim 1, wherein said metal thin film is one treated with a surface active agent or a coupling agent.

6. A magnetic recording medium as claimed in claim 1, wherein said hydrocarbon group substituted with one or more mercapto groups contains at least 3 carbon atoms.

7. A magnetic recording medium as claimed in claim 1, wherein said compound having a mercapto group and an ester bond is represented by general formula HS—R—COO—R', or

R'—COO—R—SH wherein R represents a divalent hydrocarbon group having 1 to 20 carbon atoms, and R' represents a monovalent hydrocarbon group having 1 to 20 carbon atoms.

8. A magnetic recording medium as claimed in claim 7, wherein said compound having a mercapto group and an ester bond is selected from the group consisting of monoester or diester compounds and oligoester or polyester compounds having a mercapto group.

9. A magnetic recording medium as claimed in claim 7, wherein said compound having a mercapto group and ester bond is selected from the group consisting of behenyl β-mercaptopropionate, octadecyl β-mercaptopropionate, dodecyl β-mercaptopropionate, octyl β-mercaptopropionate, oleyl β-mercaptopropionate, behenyl thioglycolate, octadecyl thioglycolate, dodecyl thioglycolate, octyl thioglycolate, oleyl thioglycolate, behenyl thiosalycilate, octadecyl thiosalycilate, dodecyl thiosalycilate, octyl thiosalycilate, methyl thiosalycilate, oleyl thiosalcilate, 2-mercaptoethyl stearate, 2-mercaptoethyl oleate, 2-mercaptoethyl myristate, and 2-mercaptoethyl laurate.

10. A magnetic recording medium as claimed in claim 7, wherein said compound having a mercapto group and an ester bond is selected from the group consisting of behenyl β-mercaptopriopionate, octadecyl β-mercaptopropionate, dodecyl β-mercaptopropionate, oleylmercaptopropionate, behenyl thioglycolate, octadecyl thioglycolate, dodecyl thioglycolate, oleyl thioglycolate, 2-mercaptoethyl stearate, 2-mercaptoethyl oleate and 2-mercaptoethyl myristate.

11. A magnetic recording medium as claimed in claim 1, wherein said compound having a mercapto group and an ester bond is a product derived from one or more of a polyfunctional acid, a polyfunctional alcohol, an acid having a hydroxy group and a self-condensation product of an acid having a hydroxy group.

12. A magnetic recording medium as claimed in claim 1, wherein said layer containing a compound having a mercapto group has a surface unevenness of 10 to 1,000 Angstroms.

13. A magnetic recording medium as claimed in claim 1, wherein said layer containing a compound having a mercapto group has a surface unevenness of 10 to 1,000 Angstrom.

14. A magnetic recording medium as claimed in claim 1, wherein the thickness of the support is from about 4 to about 50 μm.

15. A magnetic recording medium as claimed in claim 1, wherein the thickness of the support is from about 4 to about 50 μm.

* * * * *